United States Patent [19]

Ryan

[11] 4,380,317
[45] Apr. 19, 1983

[54] FURNACE CONTROL

[75] Inventor: Lawrence A. Ryan, Bartlesville, Okla.

[73] Assignee: Phillips Petroleum Company, Bartlesville, Okla.

[21] Appl. No.: 344,145

[22] Filed: Jan. 29, 1982

[51] Int. Cl.³ .................. F23N 1/00; G06F 15/46
[52] U.S. Cl. .................. 236/15 BF; 236/78 A; 364/500
[58] Field of Search .............. 236/15 BF, 24.5, 20 R, 236/15 BR; 364/505, 510, 500, 477; 122/448 B

[56] References Cited

U.S. PATENT DOCUMENTS

1,930,456 10/1933 Rumble ................. 236/15 BF
1,933,020 10/1933 Leamon ................. 236/15 BF
3,981,793 9/1976 Christie et al. .......... 364/500 X Primary Examiner—William E. Wayner

[57] ABSTRACT

In a process in which a furnace having multiple coils is utilized to heat a fluid stream, a comparison of a measured pressure of the fluid stream to a desired pressure is utilized to bias a temperature control system for the furnace which maintains the furnace outlet temperatures from the plurality of coils substantially equal so as to substantially maximize the transfer of heat to the fluid stream while maintaining a desired pressure for the fluid stream. If multiple furnaces are utilized, a bias term based on a comparison of the total flow through each furnace may be utilized to bias the temperature control system so as to maintain a desired split in the total flow between the plurality of furnaces.

40 Claims, 2 Drawing Figures

FURNACE CONTROL

This invention relates to control of the flow of a plurality of fluid streams through a furnace. In one aspect, this invention relates to method and apparatus for maintaining the furnace outlet temperatures of a plurality of fluid streams substantially equal while also maintaining a desired pressure for the fluid streams in a process in which the total flow of fluids to a furnace may vary. In another aspect this invention relates to method and apparatus for maintaining a desired division of fluid flow between a plurality of furnaces in a process in which the total flow of fluids to the plurality of furnaces may vary.

It is common to use a furnace to heat a fluid stream prior to processing of the fluid stream. An example of this is the use of a furnace to heat a crude oil feed prior to fractional distillation of the crude oil feed. Typically, the furnace utilized will have a plurality of coils through which the fluid flows so as to provide for a more efficient transfer of heat to the fluid and a plurality of furnaces may also be utilized.

For a furnace which has a plurality of coils, the transfer of heat to the fluid flowing through the coils may be substantially maximized by maintaining the furnace outlet temperatures of the plurality of fluid streams substantially equal. This may be accomplished by controlling the flow of fluid through each coil in response to a temperature measurement for each coil so as to maintain all outlet temperatures substantially equal.

In a crude oil fractional distillation process, the crude feed is typically provided through a desalter and is then heated in furnaces prior to introduction of the crude feed into the fractional distillation column. A plurality of furnaces are typically utilized for preheating although one furnace could be utilized if sufficient heat could be transferred to the crude feed by one furnace. If the flow of the crude feed through the desalter is substantially constant, then the previously described control based on temperature measurements may be utilized to maintain the desired furnace outlet temperature equality. However, if the crude feed rate is varying, as will usually be the case, control based only on temperature measurements will not be able to respond to the changing crude feed rates. The temperature may change, but since the control is trying to maintain temperature equality, there may be no changes in the position of the control valves for the plurality of coils. This may result in an undesirable pressure in the desalting and heating system which may result in an undesired liquid level in the desalter, an improper gas/liquids ratio and malfunction of the control valves which control the flow of fluid to the furnaces.

Where a plurality of furnaces are utilized for preheating, it may be desirable to maintain some desired split of the fluid because of furnace sizes or other similar constraints. Again, it is very difficult to maintain a desired flow split based only on outlet temperature measurements where the total flow may vary as would typically be in the case of a crude oil feed to a fractional distillation process.

It is thus an object of this invention to provide method and apparatus for maintaining the furnace outlet temperatures of a plurality of fluid streams substantially equal while also maintaining a desired pressure for the fluid streams in a process in which the total flow of fluids to a furnace may vary. It is another object of this invention to provide method and apparatus for maintaining a desired division of fluid flow between a plurality of furnaces and a process in which the total flow to the plurality of furnaces may vary.

In accordance with the present invention, method and apparatus are provided whereby a comparison of a measured pressure to a desired pressure is utilized to bias a temperature control system for a furnace in which the furnace outlet temperatures of a plurality of fluid streams are maintained substantially equal. Use of the bias based on the pressure comparison provides a means by which a desired pressure may be maintained and the furnace outlet temperatures of a plurality of fluid streams may be maintained substantially equal even when the total flow of fluid to the furnace is varying.

In a process in which a plurality of furnaces are utilized to heat a fluid stream and in which each of the plurality of furnaces have a plurality of coils, a comparison of the total flow through each furnace is utilized to provide a bias term for the temperature control system of one of the furnaces. The use of the bias term based on the total flow comparison provides a means for maintaining a desired split in total flow between a plurality of furnaces.

Other objects and advantages of the invention will be apparent from the foregoing brief description of the invention and the claims and from the detailed description of the drawings in which:

While the invention is illustrated and described in terms of a crude oil preheating system, the invention is applicable to the control of any process in which a furnace having a plurality of coils is utilized to heat a fluid stream. Further, the invention is illustrated and described in terms of two furnaces which each have two coils. However, the invention is applicable to systems which utilize one furnace or more than two furnaces and the furnaces utilized may have more than two coils.

Figure 1:
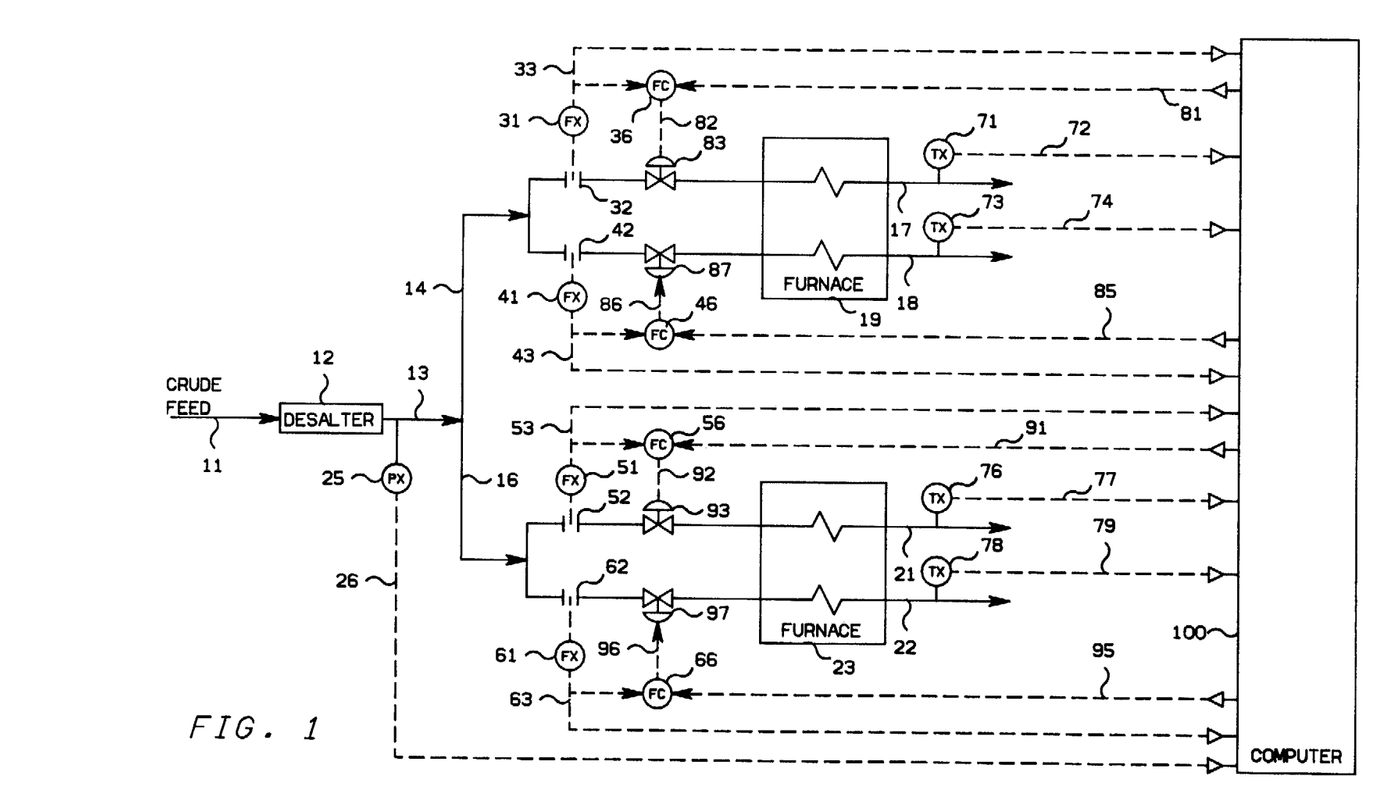
FIG. 1 is a diagrammatic illustration of a crude oil preheating system and the associated control system of the present invention.

A specific control system configuration is set forth in FIG. 1 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that if a flow is measured in pneumatic form it must be transduced to electrical form if it is to be transmitted in electrical form by a flow transducer. Also, transducing of the signals from analog form to digital form or from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to calculate the required control signal based on measured process parameters as well as set points supplied to the computer. Analog computers or other types of computing devices could also be used in the invention. The digital computer is preferably an OPTROL 7000 Process Computer System from Applied Automation, Inc., Bartlesville, Okla.

Signal lines are also utilized to represent the results of calculations carried out in a digital computer and the term "signal" is utilized to refer to such results. Thus, the term signal is used not only to refer to electrical currents or pneumatic pressures but is also used to refer to binary representations of a calculated or measured value.

The controllers shown may utilize the various modes of control such as proportional, proportional-integral, proportional-derivative, or proportional-integral-derivative. In this preferred embodiment, proportional-integral-derivative controllers are utilized but any controller capable of accepting two input signals and producing a scaled output signal, representative of a comparison of the two input signals, is within the scope of the invention.

The scaling of an output signal by a controller is well known in control system art. Essentially, the output of a controller may be scaled to represent any desired factor or variable. An example of this is where a desired flow rate and an actual flow rate is compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. While the presently preferred embodiment of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to the drawings and in particular to FIG. 1, a crude oil feed is provided through conduit means 11 to the desalter 12. Desalted crude oil is removed from the desalter 12 through conduit means 13. The crude oil flowing through conduit means 13 is split between conduit means 14 and conduit means 16. The crude oil flowing through conduit means 14 is split between conduit means 17 and conduit means 18 and is thus provided through the furnace 19. After passing through the furnace 19, the crude oil flowing through conduit means 17 and 18 would typically be provided to a fractional distillation column. In like manner, the crude oil flowing through conduit means 16 is split between conduit means 21 and 22 and is thus provided through the furnace 23. After passing through the furnace 23, the crude oil flowing through conduit means 21 and 22 would also be typically provided to a fractional distillation column.

Pressure transducer 25 in combination with a pressure sensing device, which is operably located in conduit means 13, provides an output signal 26 which is representative of the pressure of the crude oil flowing through conduit means 13. Signal 26 is provided from the pressure transducer 25 as an input to computer means 100.

Flow transducer 31 in combination with the flow sensor 32, which is operably located in conduit means 17, provides an output signal 33 which is representative of the flow rate of the crude oil flowing through conduit means 17. Signal 33 is provided from the flow transducer 31 as the process variable input to the flow controller 36 and is also provided as an input to computer means 100.

Flow transducer 41 in combination with the flow sensor 42, which is operably located in conduit means 18, provides an output signal 43 which is representative of the flow rate of the crude oil flowing through conduit means 18. Signal 43 is provided from the flow transducer 41 as the process variable input to the flow controller 46 and is also provided as an input to computer means 100.

Flow transducer 51 in combination with the flow sensor 52, which is operably located in conduit means 21, provides an output signal 53 which is representative of the flow rate of the crude oil flowing through conduit means 21. Signal 53 is provided from the flow transducer 51 as the process variable input to the flow controller 56 and is also provided as an input to computer means 100.

Flow transducer 61 in combination with the flow sensor 62, which is operably located in conduit means 22, provides an output signal 63 which is representative of the flow rate of the crude oil flowing through conduit means 22. Signal 63 is provided from the flow transducer 61 as the process variable input to the flow controller 66 and is also provided as an input to computer means 100.

Temperature transducer 71 in combination with a temperature sensing device such as a thermocouple, which is operably located in conduit means 17, provides an output signal 72 which is representative of the furnace outlet temperature of the crude oil flowing through conduit means 17. Signal 72 is provided from the temperature transducer 71 as an input to computer means 100. In like manner, temperature transducer 73 provides signal 74, which is representative of the furnace outlet temperature of the crude oil flowing through conduit means 18, to computer means 100; temperature transducer 76 provides signal 77, which is representative of the furnace outlet temperature of the crude oil flowing through conduit means 21, to computer means 100 and temperature transducer 78 provides signal 79, which is representative of the furnace outlet temperature of the crude oil flowing through conduit means 22, to computer means 100.

In response to the described measurements, computer means 100 provides a plurality of control signals which are utilized to provide set points to the flow controllers 36, 46, 56 and 66. In particular, computer means 100 provides an output signal 81 which is representative of the flow rate of crude oil through conduit means 17 required to maintain the temperature represented by signal 72 substantially equal to one-half of the sum of the temperatures represented by signals 72 and 74. Signal 81 is provided as the set point signal to the flow controller 36. In response to signals 33 and 81, the flow controller 36 provides an output signal 82 which is responsive to the difference between signals 33 and 81. Signal 82 is scaled so as to be representative of the position of the control valve 83, which is operably located in conduit means 17, required to maintain the outlet temperature of the crude oil flowing through conduit means 17 substantially equal to one-half of the sum of the temperature represented by signals 72 and 74. Signal 82 is provided from the flow controller 36 as a control signal to the control valve 83 and the control valve 83 is manipulated in response thereto.

The output signal 85 from computer means 100 is representative of the flow rate of crude oil through conduit means 18 required to maintain the temperature represented by signal 74 substantially equal to one-half of the sum of the temperatures represented by signals 72 and 74. Signal 85 is provided as the set point signal to the flow controller 46. In response to signals 43 and 85, the flow controller 46 provides an output signal 86 which is responsive to the difference between signals 43 and 85. Signal 86 is scaled so as to be representative of the position of the control valve 87, which is operably located in conduit means 18, required to maintain the outlet temperature of the crude oil flowing through conduit means 18 substantially equal to one-half of the sum of the temperature represented by signals 72 and 74. Signal 86 is provided from the flow controller 46 as a control signal to the control valve 87 and the control valve 87 is manipulated in response thereto.

The output signal 91 from computer means 100 is representative of the flow rate of crude oil through conduit means 21 required to maintain the temperature represented by signal 77 substantially equal to one-half of the sum of the temperatures represented by signals 77 and 79. Signal 91 is provided as the set point signal to the flow controller 56. In response to signals 53 and 91, the flow controller 56 provides an output signal 92 which is responsive to the difference between signals 53 and 91. Signal 92 is scaled so as to be representative of the position of the control valve 93, which is operably located in conduit means 21, required to maintain the outlet temperature of the crude oil flowing through conduit means 21 substantially equal to one-half of the sum of the temperature represented by signals 77 and 79. Signal 92 is provided from the flow controller 56 as a control signal to the control valve 93 and the control valve 93 is manipulated in response thereto.

The output signal 95 from computer means 100 is representative of the flow rate of crude oil through conduit means 22 required to maintain the temperature represented by signal 79 substantially equal to one-half of the sum of the temperatures represented by signals 77 and 79. Signal 95 is provided as the set point signal to the flow controller 66. In response to signals 63 and 95, the flow controller 66 provides an output signal 96 which is responsive to the difference between signals 63 and 95. Signal 96 is scaled so as to be representative of the position of the control valve 97, which is operably located in conduit means 22, required to maintain the outlet temperature of the crude oil flowing through conduit means 22 substantially equal to one-half of the sum of the temperature represented by signals 77 and 79. Signal 96 is provided from the flow controller 66 as a control signal to the control valve 97 and the control valve 97 is manipulated in response thereto.

Figure 2:
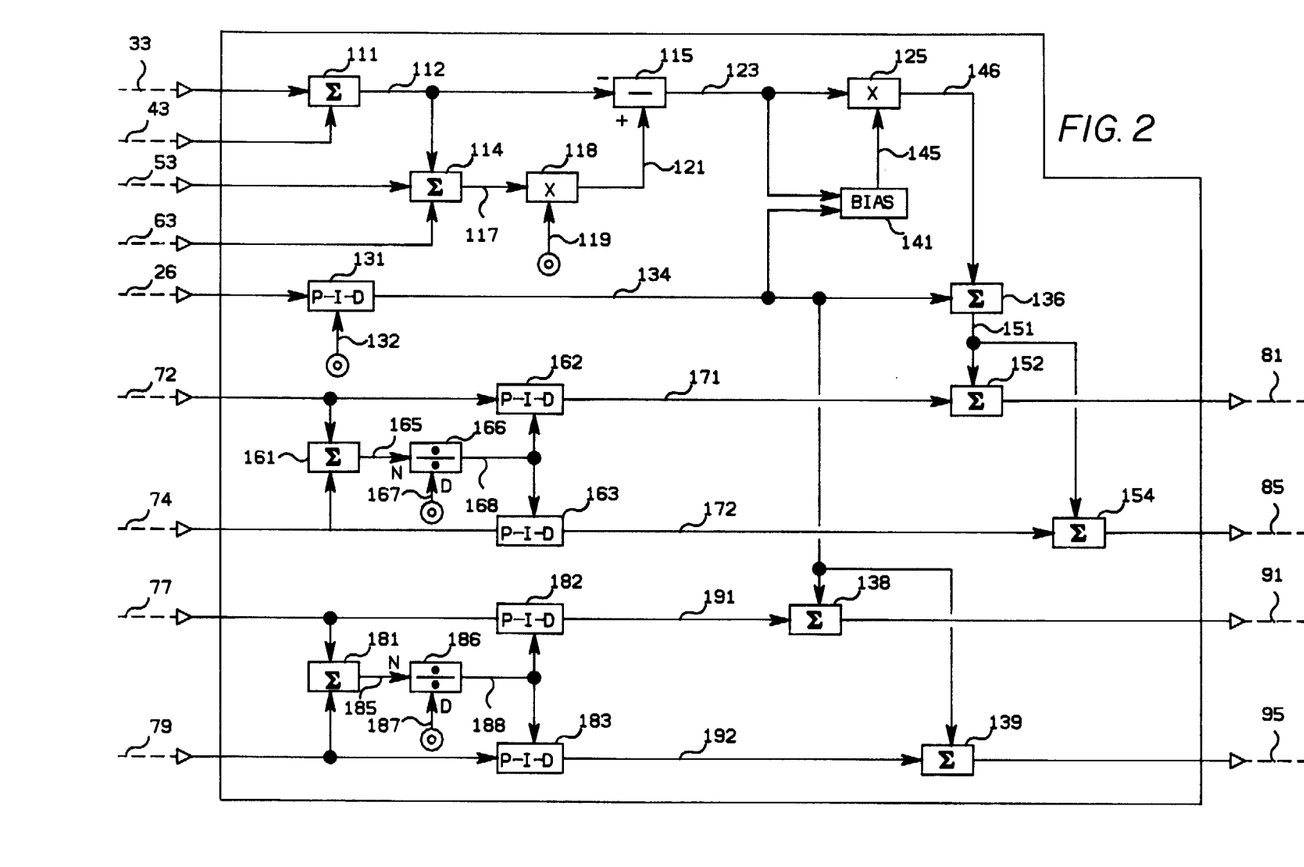
FIG. 2 is a logic flow diagram of the computer logic utilized to develop the control signals illustrated in FIG. 1 based on the process measurements illustrated in FIG. 1.

The computer logic utilized to generate control signals 81, 85, 91 and 95 is illustrated in FIG. 2. Referring now to FIG. 2, signal 33, which is representative of the flow rate of the crude oil flowing through conduit means 17, is provided as one input to the summing block 111. Signal 43, which is representative of the flow rate of the crude oil flowing through conduit means 18 is provided as a second input to the summing block 111. Signals 33 and 43 are summed to establish signal 112 which is representative of the total flow of crude oil flowing through the furnace 19. Signal 112 is provided from the summing block 111 as an input to the summing block 114 and to the subtrahend input of the subtracting block 115.

Signals 53 and 63, which are representative of the flow rate of crude oil through conduit means 21 and 22, respectively, are also provided as inputs to the summing block 114. Signals 53, 63 and 112 are summed to establish signal 117 which is representative of the total flow rate of crude oil to the furnaces 19 and 23. Signal 117 is provided from the summing block 114 as an input to the multiplying block 118.

The multiplying block 118 is also provided with an operator entered signal 119 which is representative of the desired division of flow between furnaces 19 and 23. As an example, if it is desired that seven-tenths of the crude oil flowing through conduit means 13 flow through furnace 19, signal 119 would be representative of 0.7. Signal 117 is multiplied by signal 119 to establish signal 121 which is representative of the desired flow rate of crude oil through furnace 19. Signal 121 is provided from the multiplying block 118 to the minuend input of the subtracting block 115.

Signal 112 is subtracted from signal 121 to establish signal 123. It is noted that if the flow division is as desired, the magnitude of signal 123 will be zero since signal 121 will be equal to signal 112. Only when the division of crude oil between furnace 19 and furnace 23 is not as desired will signal 123 have a magnitude. The sign of signal 123 will be determined by the desired direction of a shift in the split of the crude oil flowing through conduit means 13 needed to achieve the desired split. In the present case, if the flow to the furnace 19 is too low, the sign of signal 123 will be positive. If the flow to the furnace 23 is too low, then the sign of signal 123 will be negative. Signal 123 is provided from the subtracting block 115 as an input to the multiplying block 125 and as an input to the bias block 141.

Signal 26, which is representative of the actual pressure of the crude oil flowing through conduit means 13, is provided as the process variable input to the controller block 131. The controller block 131 is also provided with a set point signal 132 which is representative of the desired pressure of the crude oil flowing through conduit means 13. This desired pressure will generally be known by the process operators for any particular process. In response to signals 26 and 132, the controller block 131 provides an output signal 134 which is responsive to the difference between signals 26 and 132. Signal 134 is scaled so as to be repesentative of a change in flow through each of conduits 17, 18, 21 and 22 required to maintain the actual pressure of the crude oil flowing through conduit means 13 substantially equal to the desired pressure represented by signal 132. Signal 134 is provided as an input to the summing block 136, as an input to the summing blocks 138 and 139 and as an input to the bias block 141.

The bias block 141 is utilized as a priority control. In the present invention, the bias term represented by signal 134 is considered more important than the bias term represented by signal 123. In the bias block 141, the sign of signals 123 and 134 are examined. If the sign is the same, the output signal 145 from the bias block 141 is set equal to 1. If the sign is not the same, signal 145 is set equal to 0. Signal 123 is multiplied by the signal 145 to establish signal 146. Signal 146 will have a magnitude only when the flow division is not as desired and the sign of signal 123 is the same as the sign of signal 134. Signal 146 is provided from the multiplying block 125 as an input to the summing block 136.

Signals 134 and 146 are summed to establish signal 151. Signal 151 may be considered a bias term which compensates for both changes in flow required to maintain a desired pressure and changes in flow required to maintain a desired split. Signal 151 is provided as an input to the summing blocks 152 and 154.

Signal 72, which is representative of the temperature of the crude oil flowing through conduit means 17, is provided as an input to the summing block 161 and is also provided as an input to the controller block 162. Signal 74, which is representative of the temperature of the crude oil flowing through conduit means 18 is also provided as an input to the summing block 161 and is provided as an input to the controller block 163. Signals 72 and 74 are summed to establish signal 165 which is representative of the sum of the temperatures of the crude oil flowing through conduit means 17 and 18. Signal 165 is provided from the summing block 161 to the numerator input of the dividing block 166. The dividing block 166 is provided with an operator entered signal 167 which is representative of the number of temperature measurements which make up signal 165 (two in the present case). Signal 165 is divided by signal 167 to establish signal 168 which is representative of the average of the temperatures represented by signals 72 and 74. Signal 168 is provided from the dividing block 166 as the set point input to the controller block 162 and the controller block 163. It is noted that, if the temperature of the crude oil flowing through conduit means 17 is equal to the temperature of the crude oil flowing through conduit means 18, then signals 72, 74 and 168 will be equal.

In response to signals 72 and 168, the controller block 162 provides an output signal 171 which is responsive to the difference between signals 72 and 168. Signal 171 is scaled so as to be representative of the flow rate of crude oil through conduit means 17 required to maintain the temperature represented by signal 72 substantially equal to the temperature represented by signal 168. Signal 171 is provided as a second input to the summing block 152. Signal 171 is summed with signal 151 to establish the control signal 81.

In response to signals 74 and 168, the controller block 163 provides an output signal 172 which is responsive to the difference between signals 74 and 168. Signal 172 is scaled so as to be representative of the flow rate of crude oil through conduit means 18 required to maintain the temperature represented by signal 74 substantially equal to the temperature represented by signal 168. Signal 172 is provided as a second input to the summing block 154. Signal 172 is summed with signal 151 to establish the control signal 85.

Signal 77, which is representative of the temperature of the crude oil flowing through conduit means 21, is provided as an input to the summing block 181 and is also provided as an input to the controller block 182. Signal 79, which is representative of the temperature of the crude oil flowing through conduit means 22 is also provided as an input to the summing block 181 and is provided as an input to the controller block 183. Signals 77 and 79 are summed to establish signal 185 which is representative of the sum of the temperatures of the crude oil flowing through conduit means 21 and 22. Signal 185 is provided from the summing block 181 to the numerator input of the dividing block 186. The dividing block 186 is provided with an operator entered signal 187 which is representative of the number of temperature measurements which make up signal 165 (two in the present case). Signal 185 is divided by signal 187 to establish signal 188 which is representative of the average of the temperature represented by signals 77 and 79. Signal 188 is provided from the dividing block 181 as the set point input to the controller block 182 and the controller block 183. It is again noted that, if the temperature of the crude oil flowing through conduit means 21 is equal to the temperature of the crude oil flowing through conduit means 22, then signals 77, 79 and 188 will be equal.

In response to signals 77 and 188, the controller block 182 provides an output signal 191 which is responsive to the difference between signals 77 and 188. Signal 191 is scaled so as to be representative of the flow rate of crude oil through conduit means 21 required to maintain the temperature represented by signal 77 substantially equal to the temperature represented by signal 188. Signal 191 is provided as a second input to the summing block 138. Signal 191 is summed with signal 134 to establish the control signal 91.

In response to signals 79 and 188, the controller block 183 provides an output signal 192 which is responsive to the difference between signals 79 and 188. Signal 192 is scaled so as to be representative of the flow rate of crude oil through conduit means 22 required to maintain the temperature represented by signal 79 substantially equal to the temperature represented by signal 188. Signal 192 is provided as a second input to the summing block 139. Signal 192 is summed with signal 134 to establish the control signal 95.

In summary, if only one furnace is utilized, then only the bias term based on the pressure measurement will be utilized. This bias term is utilized to effectively open or close the control valves the same amount so as to maintain a desired pressure for the crude oil flowing through conduit means 13 without substantially disturbing the temperature control. If more than one furnace is utilized, then the flow division control of the present invention may be utilized. The flow division control provides a technique by which a desired flow split can be maintained again without disturbing the temperature control. Essentially, the flow split bias term is utilized to change the position of each control valve associated with only one furnace by the same amount effectively change the flow split without affecting the temperature control. It is also noted that the flow split control could be utilized without the pressure bias if desired.

The invention has been described in terms of a preferred embodiment as illustrated in FIGS. 1 and 2. Specific components used in the practice of the invention as illustrated in FIG. 1 such as pressure transducer 25, flow transducers 31, 41, 51 and 61; flow controllers 36, 46, 56 and 66; control valves 83, 87, 93 and 97; and temperature transducers 71, 73, 76 and 78 are each well known, commercially available control components such as are described at length in Perry's *Chemical Engineer's Handbook,* 4th Edition, Chapter 22, McGraw-Hill.

For reasons of brevity, conventional auxilliary equipment such as pumps, heat exchangers, additional measurement-control devices, etc. have not been included in the above description as they play no part in the explanation of the invention.

While the invention has been described in terms of the presently preferred embodiment, reasonable variations and modifications are possible by those skilled in the art and such variations and modifications are within the scope of the described invention and the appended claims.

That which is claimed is:

1. Apparatus comprising:
   a furnace having at least first and second coils;
   means for spliting a first fluid stream into at least second and third fluid streams, for passing said second fluid stream through said first coil of said furnace and for passing said third fluid stream through said second coil of said furnace;
   means for establishing a first signal representative of the actual pressure of said first fluid stream;
   means for establishing a second signal representative of the desired pressure of said first fluid stream;
   means for comparing said first signal and said second signal and for establishing a third signal which is responsive to the difference between said first signal and said second signal, wherein said third signal is scaled so as to be representative of any change in the flow rate of said second and third fluid streams required to maintain said first signal substantially equal to said second signal;
   means for establishing a fourth signal representative of the actual temperature of said second fluid stream after said second fluid stream has passed through said furnace;
   means for establishing a fifth signal representative of the desired temperature of both said second fluid stream after said second fluid stream has passed through said furnace and said third fluid stream after said third fluid stream has passed through said furnace;
   means for comparing said fourth signal and said fifth signal and for establishing a sixth signal which is responsive to the difference between said fourth signal and said fifth signal, wherein said sixth signal is scaled so as to be representative of the flow rate of said second fluid stream required to maintain said fourth signal substantially equal to said fifth signal;
   means for combining said third signal and said sixth signal to establish a seventh signal;
   means for manipulating the flow rate of said second fluid stream in response to said seventh signal;
   means for establishing an eighth signal representative of the actual temperature of said third fluid stream after said third fluid stream has passed through said furnace;
   means for comparing said eighth signal and said fifth signal and for establishing a ninth signal which is responsive to the difference between said eighth signal and said fifth signal, wherein said ninth signal is scaled so as to be representative of the flow rate of said third fluid stream required to maintain said eighth signal substantially equal to said fifth signal;
   means for combining said third signal and said ninth signal to establish a tenth signal; and
   means for manipulating the flow rate of said third fluid stream in response to said tenth signal.

2. Apparatus in accordance with claim 1 wherein said means for establishing said fifth signal comprises:
   means for adding said fourth signal and said eighth signal to establish an eleventh signal representative of the sum of the temperature of said second fluid stream and said third fluid stream; and
   means for dividing said eleventh signal by two to thereby establish said fifth signal, wherein said fifth signal is representative of the average temperature of said second fluid stream and said third fluid stream.

3. Apparatus in accordance with claim 1 wherein said means for combining said third signal and said sixth signal comprises means for summing said third signal and said sixth signal and wherein said means for combining said third signal and said ninth signal comprises means for summing said third signal and said ninth signal.

4. Apparatus in accordance with claim 1 wherein said means for manipulating the flow of said second fluid stream in response to said seventh signal and said means for manipulating the flow of said third fluid stream in response to said tenth signal comprises:
   a first control valve means operably located so as to control the flow rate of said second fluid stream;
   a second control valve means operably located so as to control the flow of said third fluid stream;
   means for establishing an eleventh signal representative of the actual flow rate of said second fluid stream;
   means for comparing said seventh signal and said eleventh signal and for establishing a twelfth signal which is responsive to the difference between said seventh signal and said eleventh signal, wherein said twelfth signal is scaled so as to be representative of the position of said first control valve means required to maintain the actual flow rate of said second fluid stream substantially equal to the desired flow rate represented by said seventh signal;

means for manipulating said first control valve means in response to said twelfth signal;

means for establishing a thirteenth signal representative of the actual flow rate of said third fluid stream;

means for comparing said tenth signal and said thirteenth signal and for establishing a fourteenth signal which is responsive to the difference between said tenth signal and said thirteenth signal, wherein said fourteenth signal is scaled so as to be representative of the position of said second control valve means required to maintain the actual flow rate of said third fluid stream substantially equal to the desired flow rate represented by said tenth signal; and means for manipulating said second control valve means in response to said fourteenth signal.

5. Apparatus comprising:

a first furnace having at least first and second coils;

a second furnace having at least first and second coils;

means for splitting a first fluid stream into at least second, third, fourth and fifth fluid streams, for passing said second fluid stream through the first coil of said first furnace, for passing said third fluid stream through the second coil of said first furnace, for passing said fourth fluid stream through the first coil of said second furnace, and for passing said fifth fluid stream through the second coil of said second furnace;

means for establishing a first signal representative of the actual pressure of said first fluid stream;

means for establishing a second signal representative of the desired pressure of said first fluid stream;

means for comparing said first signal and said second signal and for establishing a third signal which is responsive to the difference between said first signal and said second signal, wherein said third signal is scaled so as to be representative of any change in the flow rate of said second, third, fourth and fifth fluid streams required to maintain said first signal substantially equal to said second signal;

means for establishing a fourth signal representative of the actual flow rate of said first fluid stream;

means for multiplying said fourth signal by a splitting factor representative of the percentage of said first fluid stream which should pass through said first furnace to thereby establish a fifth signal representative of the desired total flow rate of fluid through said first furnace;

means for establishing a sixth signal representative of the actual total flow rate of fluid through said first furnace;

means for combining said fifth signal and said sixth signal to establish a seventh signal which is representative of any change in the flow rate of said second fluid stream and said third fluid stream required to maintain the actual total flow rate of fluid through said first furnace substantially equal to the desired total flow rate represented by said fifth signal;

means for establishing an eighth signal representative of the actual temperature of said second fluid stream after said second fluid stream has passed through said first furnace;

means for establishing a ninth signal representative of the desired temperature of both said second fluid stream after said second fluid stream has passed through said first furnace and said third fluid stream after said third fluid stream has passed through said first furnace;

means for comparing said eighth signal and said ninth signal and for establishing a tenth signal which is responsive to the difference between said eighth signal and said ninth signal, wherein said tenth signal is scaled so as to be representative of the flow rate of said second fluid stream required to maintain said eighth signal substantially equal to said ninth signal;

means for combining said third, seventh and tenth signals to establish an eleventh signal;

means for manipulating the flow rate of said second fluid stream in response to said eleventh signal;

means for establishing a twelfth signal representative of the actual temperature of said third fluid stream after said third fluid stream has passed through said first furnace;

means for comparing said twelfth signal and said ninth signal and for establishing a thirteenth signal which is responsive to the difference between said twelfth signal and said ninth signal, wherein said thirteenth signal is scaled so as to be representative of the flow rate of said third fluid stream required to maintain said twelfth signal substantially equal to said ninth signal;

means for combining said third, seventh and thirteenth signals to establish a fourteenth signal;

means for manipulating the flow rate of said third fluid stream in response to said fourteenth signal;

means for establishing a fifteenth signal representative of the actual temperature of said fourth fluid stream after said fourth fluid stream has passed through said second furnace;

means for establishing a sixteenth signal representative of the desired temperature of both said fourth fluid stream after said fourth fluid stream has passed through said second furnace and said fifth fluid stream after said fifth fluid stream has passed through said second furnace;

means for comparing said fifteenth signal and said sixteenth signal and for establishing a seventeenth signal which is responsive to the difference between said fifteenth signal and said sixteenth signal, wherein said seventeenth signal is scaled so as to be representative of the flow rate of said fourth fluid stream required to maintain said fifteenth signal substantially equal to said sixteenth signal;

means for combining said third signal and said seventeenth signal to establish an eighteenth signal;

means for manipulating the flow rate of said fourth fluid stream in response to said eighteenth signal;

means for establishing a nineteenth signal representative of the actual temperature of said fifth fluid stream after said fifth fluid stream has passed through said second furnace;

means for comparing said nineteenth signal and said sixteenth signal and for establishing a twentieth signal which is responsive to the difference between said nineteenth signal and said sixteenth signal, wherein said twentieth signal is scaled so as to be representative of the flow rate of said fifth fluid stream required to maintain said nineteenth signal substantially equal to said sixteenth signal;

means for combining said third signal and said twentieth signal to establish a twenty-first signal; and means for manipulating the flow rate of said fifth fluid stream in response to said twenty-first signal.

6. Apparatus in accordance with claim 5 wherein said means for establishing said fourth signal comprises:

means for establishing a twenty-second signal representative of the actual flow rate of said second fluid stream;

means for establishing a twenty-third signal representative of the actual flow rate of said third fluid stream;

means for establishing a twenty-fourth signal representative of the actual flow rate of said fourth fluid stream;

means for establishing a twenty-fifth signal representative of the actual flow rate of said fifth fluid stream; and means for summing said twenty-second, twenty-third, twenty-fourth and twenty-fifth signals to establish said fourth signal.

7. Apparatus in accordance with claim 6 wherein said means for establishing said sixth signal comprises means for summing said twenty-second and twenty-third signals.

8. Apparatus in accordance with claim 5 wherein said means for combining said fifth signal and said sixth signal to establish said seventh signal comprises means for subtracting said sixth signal from said fifth signal.

9. Apparatus in accordance with claim 5 wherein said means for establishing said ninth signal comprises:

means for adding said eighth signal and said twelfth signal to establish a twenty-second signal representative of the sum of the temperature of said second fluid stream and said third fluid stream; and means for dividing said twenty-second signal by two to thereby establish said ninth signal, wherein said ninth signal is representative of the average temperature of said second fluid stream and said third fluid stream.

10. Apparatus in accordance with claim 5 wherein said means for establishing said sixteenth signal comprises:

means for adding said fifteenth signal and said nineteenth signal to establish a twenty-second signal representative of the sum of the temperature of said fourth fluid stream and said fifth fluid stream; and means for dividing said twenty-second signal by two to thereby establish said sixteenth signal, wherein said sixteenth signal is representative of the average temperature of said fourth fluid stream and said fifth fluid stream.

11. Apparatus in accordance with claim 5 wherein said means for combining said third, seventh and tenth signals comprises means for summing said third, seventh and tenth signals; wherein said means for combining said third, seventh and thirteenth signals comprises means for summing said third, seventh and thirteenth signals; wherein said means for combining said third signal and said seventeenth signal comprises means for summing said third signal and said seventeenth signal and wherein said means for combining said third signal and said twentieth signal comprises means for summing said third signal and said twentieth signal.

12. Apparatus in accordance with claim 5 wherein said means for manipulating the flow of said second fluid stream in response to said eleventh signal, said means for manipulating the flow of said third fluid stream in response to said fourteenth signal, said means for manipulating the flow of said fourth fluid stream in response to said eighteenth signal and said means for manipulating the flow of said fifth fluid stream in response to said twenty-first signal comprises:

a first control valve means operably located so as to control the flow rate of said second fluid stream;

a second control valve means operably located so as to control the flow of said third fluid stream;

a third control valve means operably located so as to control the flow rate of said fourth fluid stream;

a fourth control valve means operably located so as to control the flow of said fifth fluid stream;

means for establishing a twenty-second signal representative of the actual flow rate of said second fluid stream;

means for comparing said eleventh signal and said twenty-second signal and for establishing a twenty-third signal which is responsive to the difference between said eleventh signal and said twenty-second signal, wherein said twenty-third signal is scaled so as to be representative of the position of said first control valve means required to maintain the actual flow rate of said second fluid stream substantially equal to the desired flow rate represented by said eleventh signal;

means for manipulating said first control valve means in response to said twenty-third signal;

means for establishing a twenty-fourth signal representative of the actual flow rate of said third fluid stream;

means for comparing said fourteenth signal and said twenty-fourth signal and for establishing a twenty-fifth signal which is responsive to the difference between said fourteenth signal and said twenty-fourth signal, wherein said twenty-fourth signal is scaled so as to be representative of the position of said second control valve means required to maintain the actual flow rate of said third fluid stream substantially equal to the desired flow rate represented by said fourteenth signal;

means for manipulating said second control valve means in response to said twenty-fifth signal;

means for establishing a twenty-sixth signal representative of the actual flow rate of said fourth fluid stream;

means for comparing said eighteenth signal and said twenty-sixth signal and for establishing a twenty-seventh signal which is responsive to the difference between said eighteenth signal and said twenty-sixth signal, wherein said twenty-seventh signal is scaled so as to be representative of the position of said third control valve means required to maintain the actual flow rate of said fourth fluid stream substantially equal to the desired flow rate represented by said eighteenth signal;

means for manipulating said third control valve means in response to said twenty-seventh signal;

means for establishing a twenty-eighth signal representative of the actual flow rate of said fifth fluid stream;

means for comparing said twenty-first signal and said twenty-eighth signal and for establishing a twenty-ninth signal which is responsive to the difference between said twenty-first signal and said twenty-eighth signal, wherein said twenty-ninth signal is scaled so as to be representative of the position of said fourth control valve means required to maintain the actual flow rate of said fifth fluid stream substantially equal to the desired flow rate represented by said twenty-first signal; and means for manipulating said fourth control valve means in response to said twenty-ninth signal.

13. Apparatus comprising:

a first furnace having at least first and second coils;

a second furnace having at least first and second coils;

means for splitting a first fluid stream into at least second, third, fourth and fifth fluid streams, for passing said second fluid stream through the first coil of said first furnace, for passing said third fluid stream through the second coil of said first furnace, for passing said fourth fluid stream through the first coil of said second furnace, and for passing said fifth fluid stream through the second coil of said second furnace;

means for establishing a first signal representative of the flow rate of said first fluid stream;

means for multiplying said first signal by a splitting factor representative of the percentage of said first fluid stream which it is desired to pass through said first furnace to thereby establish a second signal representative of the desired total flow rate of fluid through said first furnace;

means for establishing a third signal representative of the actual total flow rate of fluid through said first furnace;

means for combining said second signal and said third signal to establish a fourth signal which is representative of any change in the flow rate of said second fluid stream and said third fluid stream required to maintain the actual total flow rate of fluid through said first furnace substantially equal to the desired total flow rate represented by said second signal;

means for establishing a fifth signal representative of the actual temperature of said second fluid stream after said second fluid stream has passed through said first furnace;

means for establishing a sixth signal representative of the desired temperature of both said second fluid stream after said second fluid stream has passed through said first furnace and said third fluid stream after said third fluid stream has passed through said first furnace;

means for comparing said fifth signal and said sixth signal and for establishing a seventh signal which is responsive to the difference between said fifth signal and said sixth signal, wherein said seventh signal is scaled so as to be representative of the flow rate of said second fluid stream required to maintain said fifth signal substantially equal to said sixth signal;

means for combining said third signal and said seventh signal establish an eighth signal;

means for manipulating the flow rate of said second fluid stream in response to said eighth signal;

means for establishing a ninth signal representative of the actual temperature of said third fluid stream after said third fluid stream has passed through said first furnace;

means for comparing said ninth signal and said sixth signal and for establishing a tenth signal which is responsive to the difference between said ninth signal and said sixth signal, wherein said tenth signal is scaled so as to be representative of the flow rate of said third fluid stream required to maintain said ninth signal substantially equal to said sixth signal;

means for combining said third signal and said tenth signal to establish an eleventh signal;

means for manipulating the flow rate of said third fluid stream in response to said eleventh signal;

means for establishing a twelfth signal representative of the actual temperature of said fourth fluid stream after said fourth fluid stream has passed through said second furnace;

means for establishing a thirteenth signal representative of the desired temperature of both said fourth fluid stream after said fourth fluid stream has passed through said second furnace and said fifth fluid stream after said fifth fluid stream has passed through said second furnace;

means for comparing said twelfth signal and said thirteenth signal and for establishing a fourteenth signal which is responsive to the difference between said twelfth signal and said thirteenth signal, wherein said fourteenth signal is scaled so as to be representative of the flow rate of said fourth fluid stream required to maintain said twelfth signal substantially equal to said thirteenth signal;

means for manipulating the flow rate of said fourth fluid stream in response to said fourteenth signal;

means for establishing a fifteenth signal representative of the actual temperature of said fifth fluid stream after said fifth fluid stream has passed through said second furnace;

means for comparing said fifteenth signal and said thirteenth signal and for establishing a sixteenth signal which is responsive to the difference between said fifteenth signal and said thirteenth signal, wherein said sixteenth signal is scaled so as to be representative of the flow rate of said fifth fluid stream required to maintain said fifteenth signal substantially equal to said thirteenth signal; and means for manipulating the flow rate of said fifth fluid stream in response to said sixteenth signal.

14. Apparatus in accordance with claim 13 wherein said means for establishing said first signal comprises:

means for establishing a seventeenth signal representative of the actual flow rate of said second fluid stream;

means for establishing an eighteenth signal representative of the actual flow rate of said third fluid stream;

means for establishing a nineteenth signal representative of the actual flow rate of said fourth fluid stream;

means for establishing a twentieth signal representative of the actual flow rate of said fifth fluid stream; and means for summing said seventeenth, eighteenth, nineteenth and twentieth signals to establish said first signal.

15. Apparatus in accordance with claim 14 wherein said means for establishing said third signal comprises means for summing said seventeenth and eighteenth signals.

16. Apparatus in accordance with claim 13 wherein said means for combining said second signal and said third signal comprises means for subtracting said third signal from said second signal.

17. Apparatus in accordance with claim 13 wherein said means for establishing said sixth signal comprises:

means for adding said fifth signal and said ninth signal to establish a seventeenth signal representative of the sum of the temperature of said second fluid stream and said third fluid stream; and means for dividing said seventeenth signal by two to thereby establish said sixth signal wherein said sixth signal is representative of the average temperature of said second fluid stream and said third fluid stream.

18. Apparatus in accordance with claim 13 wherein said means for establishing said thirteenth signal comprises:

means for adding said twelfth signal and said fifteenth signal to establish a seventeenth signal representative of the sum of the temperature of said fourth fluid stream and said fifth fluid stream; and means for dividing said seventeenth signal by two to thereby establish said thirteenth signal, wherein said thirteenth signal is representative of the average temperature of said fourth fluid stream and said fifth fluid stream.

19. Apparatus in accordance with claim 13 wherein said means for combining said third signal and said seventh signal comprises means for summing said third signal and said seventh signal and wherein said means for combining said third signal and said tenth signal comprises means for summing said third signal and said tenth signal.

20. Apparatus in accordance with claim 13 wherein said means for manipulating the flow of said second fluid stream in response to said eighth signal, said means for manipulating the flow of said third fluid stream in response to said eleventh signal, said means for manipulating the flow of said fourth fluid stream in response to said fourteenth signal and said means for manipulating the flow of said fifth fluid stream in response to said sixteenth signal comprises:

a first control valve means operably located so as to control the flow rate of said second fluid stream;

a second control valve means operably located so as to control the flow of said third fluid stream;

a third control valve means operably located so as to control the flow rate of said fourth fluid stream;

a fourth control valve means operably located so as to control the flow of said fifth fluid stream;

means for establishing a seventeenth signal representative of the actual flow rate of said second fluid stream;

means for comparing said eighth signal and said seventeenth signal and for establishing an eighteenth signal which is responsive to the difference between said eighth signal and said seventeenth signal, wherein said eighteenth signal is scaled so as to be representative of the position of said first control valve means required to maintain the actual flow rate of said second fluid stream substantially equal to the desired flow rate represented by said eighth signal;

means for manipulating said first control valve means in response to said eighteenth signal;

means for establishing a nineteenth signal representative of the actual flow rate of said third fluid stream;

means for comparing said eleventh signal and said nineteenth signal and for establishing a twentieth signal which is responsive to the difference between said eleventh signal and said nineteenth signal, wherein said twentieth signal is scaled so as to be representative of the position of said second control valve means required to maintain the actual flow rate of said third fluid stream substantially equal to the desired flow rate repesented by said eleventh signal;

means for manipulating said second control valve means in response to said twentieth signal;

means for establishing a twnety-first signal representative of the actual flow rate of said fourth fluid stream;

means for comparing said fourteenth signal and said twenty-first signal and for establishing a twnety-second signal which is responsive to the difference between said fourteenth signal and said twenty-first signal, wherein said twenty-second signal is scaled so as to be representative of the position of said third control valve means required to maintain the actual flow rate of said fourth fluid stream substantially equal to the desired flow rate represented by said fourteenth signal;

means for manipulating said third control valve means in response to said twenty-second signal;

means for establishing a twenty-third signal representative of the actual flow rate of said fifth fluid stream;

means for comparing said sixteenth signal and said twenty-third signal and for establishing a twenty-fourth signal which is responsive to the difference between said sixteenth signal and said twenty-third signal, wherein said twenty-fourth signal is scaled so as to be representative of the position of said fourth control valve means required to maintain the actual flow rate of said fifth fluid stream substantially equal to the desired flow rate represented by said sixteenth signal; and means for manipulating said fourth control valve means in response to said twenty-fourth signal.

21. A method for controlling the pressure of a first fluid stream which is split into second and third fluid streams with the second fluid stream being passed through the first coil of a furnace and the third fluid stream being passed through the second coil of said furnace and for controlling the temperature of said second fluid stream after said second fluid stream has passed through said furnace and the temperature of said third fluid stream after said third fluid stream has passed through said furnace, said method comprising the steps of:

establishing a first signal repesentative of the actual pressure of said first fluid stream;

establishing a second signal representative of the desired pressure of said first fluid stream;

comparing said first signal and said second signal and establishing a third signal which is responsive to the difference between said first signal and said second signal, wherein said third signal is scaled so as to be representative of any change in the flow rate of said second and third fluid streams required to maintain said first signal substantially equal to said second signal;

establishing a fourth signal representative of the actual temperature of said second fluid stream after said second fluid stream has passed through said furnace;

establishing a fifth signal representative of the desired temperature of both said second fluid stream after said second fluid stream has passed through said furnace and said third fluid stream after said third fluid stream has passed through said furnace;

comparing said fourth signal and said fifth signal and establishing a sixth signal which is responsive to the difference between said fourth signal and said fifth signal, wherein said sixth signal is scaled so as to be representative of the flow rate of said second fluid stream required to maintain said fourth signal substantially equal to said fifth signal;

combining said third signal and said sixth signal to establish a seventh signal;

manipulating the flow rate of said second fluid stream in response to said seventh signal;

establishing an eighth signal representative of the actual temperature of said third fluid stream after said third fluid stream has passed through said furnace;

comparing said eighth signal and said fifth signal and establishing a ninth signal which is responsive to the difference between said eighth signal and said fifth signal, wherein said ninth signal is scaled so as to be representative of the flow rate of said third fluid stream required to maintain said eighth signal substantially equal to said fifth signal;

combining said third signal and said ninth signal to establish a tenth signal; and manipulating the flow rate of said third fluid stream in response to said tenth signal.

22. A method in accordance with claim 21 wherein said step of establishing said fifth signal comprises:
 adding said fourth signal and said eighth signal to establish an eleventh signal representative of the sum of the temperature of said second fluid stream and said third fluid stream; and
 dividing said eleventh signal by two to thereby establish said fifth signal, wherein said fifth signal is representative of the average temperature of said second fluid stream and said third fluid stream.

23. A method in accordance with claim 21 wherein said step of combining said third signal and said sixth signal comprises summing said third signal and said sixth signal and wherein said step of combining said third signal and said ninth signal comprises summing said third signal and said ninth signal.

24. A method in accordance with claim 21 wherein said step of manipulating the flow of said second fluid stream in response to said seventh signal and said step of manipulating the flow of said third fluid stream in response to said tenth signal comprises:
 establishing an eleventh signal representative of the actual flow rate of said second fluid stream;
 comparing said seventh signal and said eleventh signal and establishing a twelfth signal which is responsive to the difference between said seventh signal and said eleventh signal, wherein said twelfth signal is scaled so as to be representative of the position of a first control valve, which is operably located so as to control the flow rate of said second fluid stream, required to maintain the actual flow rate of said second fluid stream substantially equal to the desired flow rate represented by said seventh signal;
 manipulating said first control valve in response to said twelfth signal;
 establishing a thirteenth signal repesentative of the actual flow rate of said third fluid stream;
 comparing said tenth signal and said thirteenth signal and establishing a fourteenth signal which is responsive to the difference between said tenth signal and said thirteenth signal, wherein said fourteenth signal is scaled so as to be representative of the position of a second control valve, which is operably located so as to control the flow of said third fluid stream, required to maintain the actual flow rate of said third fluid stream substantially equal to the desired flow rate represented by said tenth signal; and
 means for manipulating said second control valve means in response to said fourteenth signal.

25. A method for controlling the pressure of a first fluid stream which is split into second, third, fourth and fifth fluid streams with the second fluid stream being passed through the first coil of a first furnace, the third fluid stream being passed through the second coil of said first furnace, the fourth fluid stream being passed through the first coil of a second furnace, and the fifth fluid stream being passed through the second coil of said second furnace, for controlling the temperature of said second, third, fourth and fifth fluid streams after said second, third, fourth and fifth fluid streams have passed through said first and second furnaces respectively, and for controlling the percentage of said first fluid stream which is passed through said first furnace, said method comprising the steps of:
 establishing a first signal representative of the actual pressure of said first fluid stream;
 establishing a second signal representative of the desired pressure of said first fluid stream;
 comparing said first signal and said second signal and establishing a third signal which is responsive to the difference between said first signal and said second signal, wherein said third signal is scaled so as to be representative of any change in the flow rate of said second, third, fourth and fifth fluid streams required to maintain said first signal substantially equal to said second signal;
 establishing a fourth signal representative of the actual flow rate of said first fluid stream;
 multiplying said fourth signal by a splitting factor representative of the percentage of said first fluid stream which should pass through said first furnace to thereby establish a fifth signal representative of the desired total flow rate of fluid through said first furnace;
 establishing a sixth signal representative of the actual total flow rate of fluid through said first furnace;
 combining said fifth signal and said sixth signal to establish a seventh signal which is representative of any change in the flow rate of said second fluid stream and said third fluid stream required to maintain the actual total flow rate of fluid through said first furnace substantially equal to the desired total flow rate represented by said fifth signal;
 establishing an eighth signal representative of the actual temperature of said second fluid stream after said second fluid stream has passed through said first furnace;
 establishing a ninth signal representative of the desired temperature of both said second fluide stream after said second fluid stream has passed through said first furnace and said third fluid stream after said third fluid stream has passed through said first furnace;
 comparing said eighth signal and said ninth signal and establishing a tenth signal which is responsive to the difference between said eighth signal and said ninth signal, wherein said tenth signal is scaled so as to be representative of the flow rate of said second fluid stream required to maintain said eighth signal substantially equal to said ninth signal;

combining said third, seventh and tenth signals to establish an eleventh signal;

manipulating the flow rate of said second fluid stream in response to said eleventh signal;

establishing a twelfth signal representative of the actual temperature of said third fluid stream after said third fluid stream has passed through said first furnace;

comparing said twelfth signal and said ninth signal and establishing a thirteenth signal which is responsive to the difference between said twelfth signal and said ninth signal, wherein said thirteenth signal is scaled so as to be representative of the flow rate of said third fluid stream required to maintain said twelfth signal substantially equal to said ninth signal;

combining said third, seventh and thirteenth signals to establish a fourteenth signal;

manipulating the flow rate of said third fluid stream in response to said fourteenth signal;

establishing a fifteenth signal representative of the actual temperature of said fourth fluid stream after said fourth fluid stream has passed through said second furnace;

establishing a sixteenth signal representative of the desired temperature of both said fourth fluid stream after said fourth fluid stream has passed through said second furnace and said fifth fluid stream after said fifth fluid stream has passed through said second furnace;

comparing said fifteenth signal and said sixteenth signal and establishing a seventeenth signal which is responsive to the difference between said fifteenth signal and said sixteenth signal, wherein said seventeenth signal is scaled so as to be representative of the flow rate of said fourth fluid stream required to maintain said fifteenth signal substantially equal to said sixteenth signal;

combining said third signal and said seventeenth signal to establish an eighteenth signal;

manipulating the flow rate of said fourth fluid stream in response to said eighteenth signal;

establishing a nineteenth signal representative of the actual temperature of said fifth fluid stream after said fifth fluid stream has passed through said second furnace;

comparing said nineteenth signal and said sixteenth signal and establishing a twentieth signal which is responsive to the difference between said nineteenth signal and said sixteenth signal, wherein said twentieth signal is scaled so as to be representative of the flow rate of said fifth fluid stream required to maintain said nineteenth signal substantially equal to said sixteenth signal;

combining said third signal and said twentieth signal to establish a twenty-first signal; and manipulating the flow rate of said fifth fluid stream in response to said twenty-first signal.

26. A method in accordance with claim 25 wherein said step of establishing said fourth signal comprises:

establishing a twenty-second signal representative of the actual flow rate of said second fluid stream;

establishing a twenty-third signal representative of the actual flow rate of said third fluid stream;

establishing a twenty-fourth signal representative of the actual flow rate of said fourth fluid stream;

establishing a twenty-fifth signal representative of the actual flow rate of said fifth fluid stream; and summing said twenty-second, twenty-third, twenty-fourth and twenty-fifth signal to establish said fourth signal.

27. A method in accordance with claim 26 wherein said step of establishing said sixth signal comprises summing said twenty-second and twenty-third signals.

28. A method in accordance with claim 25 wherein said step of combining said fifth signal and said sixth signal to establish said seventh signal comprises subtracting said sixth signal from said fifth signal.

29. A method in accordance with claim 25 wherein said step of establishing said ninth signal comprises:

adding said eighth signal and said twelfth signal to establish a twenty-second signal representative of the sum of the temperature of said second fluid stream and said third fluid stream; and dividing said twenty-second signal by two to thereby establish said ninth signal, wherein said ninth signal is representative of the average temperature of said second fluid stream and said third fluid stream.

30. A method in accordance with claim 25 wherein said step of establishing said sixteenth signal comprises:

adding said fifteenth signal and said nineteenth signal to establish a twenty-second signal representative of the sum of the temperature of said fourth fluid stream and said fifth fluid stream; and dividing said twenty-second signal by two to thereby establish said sixteenth signal, wherein said sixteenth signal is representative of the average temperature of said fourth fluid stream and said fifth fluid stream.

31. A method in accordance with claim 25 wherein said step of combining said third, seventh and tenth signals comprises summing said third, seventh and tenth signals; wherein said step of combining said third, seventh and thirteenth signals comprises summing said third, seventh and thirteenth signals; wherein said step of combining said third signal and said seventeenth signal comprises summing said third signal and said seventeenth signal and wherein said step of combining said third signal and said twentieth signal comprises summing said third signal and said twentieth signal.

32. A method in accordance with claim 25 wherein said step of manipulating the flow of said second fluid stream in response to said eleventh signal, said step of manipulating the flow of said third fluid stream in response to said fourteenth signal, said step of manipulating the flow of said fourth fluid stream in response to said eighteenth signal and said step of manipulating the flow of said fifth fluid stream in response to said twenty-first signal comprises:

establishing a twenty-second signal representative of the actual flow rate of said second fluid stream;

comparing said eleventh signal and said twenty-second signal and establishing a twenty-third signal which is responsive to the difference between said eleventh signal and said twenty-second signal, wherein said twenty-third signal is scaled so as to be representative of the position of a first control valve, which is operably located so as to control the flow rate of said second fluid stream, required to maintain the actual flow rate of said second fluid stream substantially equal to the desired flow rate represented by said eleventh signal;

manipulating said first control valve in response to said twenty-third signal;

establishing a twenty-fourth signal representative of the actual flow rate of said third fluid stream;

comparing said fourteenth signal and said twenty-fourth signal and establishing a twenty-fifth signal which is responsive to the difference between said fourteenth signal and said twenty-fourth signal, wherein said twenty-fourth signal is scaled so as to be representative of the position of a second control valve, operably located so as to control the flow of said third fluid stream, required to maintain the actual flow rate of said third fluid stream substantially equal to the desired flow rate represented by said fourteenth signal;

manipulating said second control valve in response to said twenty-fifth signal;

establishing a twenty-sixth signal representative of the actual flow rate of said fourth fluid stream;

comparing said eighteenth signal and said twenty-sixth signal and establishing a twenty-seventh signal which is responsive to the difference between said eighteenth signal and said twenty-sixth signal, wherein said twenty-seventh signal is scaled so as to be representative of the position of a third control valve, operably located so as to control the flow rate of said fourth fluid stream, required to maintain the actual flow rate of said fourth fluid stream substantially equal to the desired flow rate represented by said eighteenth signal;

manipulating said third control valve in response to said twenty-seventh signal;

establishing a twenty-eighth signal representative of the actual flow rate of said fifth fluid stream;

comparing said twenty-first signal and said twenty-eighth signal and establishing a twenty-ninth signal which is responsive to the difference between said twenty-first signal and said twenty-eighth signal, wherein said twenty-ninth signal is scaled so as to be representative of the position of a fourth control valve, operably located so as to control the flow of said fifth fluid stream, required to maintain the actual flow rate of said fifth fluid stream substantially equal to the desired flow rate represented by said twenty-first signal; and manipulating said fourth control valve in response to said twenty-ninth signal.

33. In a process in which a first fluid stream is split into second, third, fourth and fifth fluid streams, with the second fluid stream being passed through the first coil of a first furnace, the third fluid stream being passed through the second coil of said first furnace, the fourth fluid stream being passed through the first coil of a second furnace and the fifth fluid stream being passed through the second coil of said second furnace, a method for controlling the temperature of said second, third, fourth and fifth fluid streams after said second, third, fourth and fifth fluid streams have passed through said first and second furnaces respectively and for controlling the percentage of said first fluid stream which is passed through said first furnace, said method comprising the steps of:

establishing a first signal representative of the flow rate of said first fluid stream;

multiplying said first signal by a splitting factor representative of the percentage of said first fluid stream which it is desired to pass through said first furnace to thereby establish a second signal representative of the desired total flow rate of fluid through said first furnace;

establishing a third signal representative of the actual total flow rate of fluid through said first furnace;

combining said second signal and said third signal to establish a fourth signal which is representative of any change in the flow rate of said second fluid stream and said third fluid stream required to maintain the actual total flow rate of fluid through said first furnace substantially equal to the desired total flow rate represented by said second signal;

establishing a fifth signal representative of the actual temperature of said second fluid stream after said second fluid stream has passed through said first furnace;

establishing a sixth signal representative of the desired temperature of both said second fluid stream after said second fluid stream has passed through said first furnace and said third fluid stream after said third fluid stream has passed through said first furnace;

comparing said fifth signal and said sixth signal and establishing a seventh signal which is responsive to the difference between said fifth signal and said sixth signal, wherein said seventh signal is scaled so as to be representative of the flow rate of said second fluid stream required to maintain said fifth signal substantially equal to said sixth signal;

combining said third signal and said seventh signal establish an eighth signal;

manipulating the flow rate of said second fluid stream in response to said eighth signal;

establishing a ninth signal representative of the actual temperature of said third fluid stream after said third fluid stream has passed through said first furnace;

comparing said ninth signal and said sixth signal and establishing a tenth signal which is responsive to the difference between said ninth signal and said sixth signal, wherein said tenth signal is scaled so as to be representative of the flow rate of said third fluid stream required to maintain said ninth signal substantially equal to said sixth signal;

combining said third signal and said tenth signal to establish an eleventh signal;

manipulating the flow rate of said third fluid stream in response to said eleventh signal;

establishing a twelfth signal representative of the actual temperature of said fourth fluid stream after said fourth fluid stream has passed through said second furnace;

establishing a thirteenth signal representative of the desired temperature of both said fourth fluid stream after said fourth fluid stream has passed through said second furnace and said fifth fluid stream after said fifth fluid stream has passed through said second furnace;

comparing said twelfth signal and said thirteenth signal and establishing a fourteenth signal which is responsive to the difference between said twelfth signal and said thirteenth signal, wherein said fourteenth signal is scaled so as to be representative of the flow rate of said fourth fluid stream required to maintain said twelfth signal substantially equal to said thirteenth signal;

manipulating the flow rate of said fourth fluid stream in response to said fourteenth signal;

establishing a fifteenth signal representative of the actual temperature of said fifth fluid stream after said fifth fluid stream has passed through said second furnace;

comparing said fifteenth signal and said thirteenth signal and establishing a sixteenth signal which is responsive to the difference between said fifteenth signal and said thirteenth signal, wherein said sixteenth signal is scaled so as to be representative of the flow rate of said fifth fluid stream required to maintain said fifteenth signal substantially equal to said thirteenth signal; and manipulating the flow rate of said fifth fluid stream in response to said sixteenth signal.

34. A method in accordance with claim 33 wherein said step of establishing said first signal comprises:
establishing a seventeenth signal representative of the actual flow rate of said second fluid stream;
establishing an eighteenth signal representative of the actual flow rate of said third fluid stream;
establishing a nineteenth signal representative of the actual flow rate of said fourth fluid stream;
establishing a twentieth signal representative of the actual flow rate of said fifth fluid stream; and
summing said seventeenth, eighteenth, nineteenth and twentieth signals to establish said first signal.

35. A method in accordance with claim 34 wherein said step of establishing said third signal comprises summing said seventeenth and eighteenth signals.

36. A method in accordance with claim 33 wherein said step of combining said second signal and said third signal comprises subtracting said third signal from said second signal.

37. Apparatus in accordance with claim 33 wherein said step of establishing said sixth signal comprises:
adding said fifth signal and said ninth signal to establish a seventeenth signal representative of the sum of the temperature of said second fluid stream and said third fluid stream; and
dividing said seventeenth signal by two to thereby establish said sixth signal wherein said sixth signal is representative of the average temperature of said second fluid stream and said third fluid stream.

38. A method in accordance with claim 33 wherein said step of establishing said thirteenth signal comprises:
adding said twelfth signal and said fifteenth signal to establish a seventeenth signal representative of the sum of the temperature of said fourth fluid stream and said fifth fluid stream; and
dividing said seventeenth signal by two to thereby establish said thirteenth signal, wherein said thirteenth signal is representative of the average temperature of said fourth fluid stream and said fifth fluid stream.

39. A method in accordance with claim 33 wherein said step of combining said third signal and said seventh signal comprises summing said third signal and said seventh signal and wherein said step of combining said third signal and said tenth signal comprises summing said third signal and said tenth signal.

40. A method in accordance with claim 33 wherein said step of manipulating the flow of said second fluid stream in response to said eighth signal, said step of manipulating the flow of said third fluid stream in response to said eleventh signal, said step of manipulating the flow of said fourth fluid stream in response to said fourteenth signal and said step of manipulating the flow of said fifth fluid stream in response to said sixteenth signal comprises:
establishing a seventeenth signal representative of the actual flow rate of said second fluid stream;
comparing said eighth signal and said seventeenth signal and establishing an eighteenth signal which is responsive to the difference between said eighth signal and said seventeenth signal, wherein said eighteenth signal is scaled so as to be representative of the position of a first control valve, which is operably located so as to control the flow rate of said second fluid stream, required to maintain the actual flow rate of said second fluid stream substantially equal to the desired flow rate represented by said eighth signal;
manipulating said first control valve in response to said eighteenth signal;
establishing a nineteenth signal representative of the actual flow rate of said third fluid stream;
comparing said eleventh signal and said nineteenth signal and establishing a twentieth signal which is responsive to the difference between said eleventh signal and said nineteenth signal, wherein said twentieth signal is scaled so as to be representative of the position of a second control valve, which is operably located so as to control the flow of said third fluid stream, required to maintain the actual flow rate of said third fluid stream substantially equal to the desired flow rate represented by said eleventh signal;
manipulating said second control valve in response to said twentieth signal;
establishing a twenty-first signal representative of the actual flow rate of said fourth fluid stream;
comparing said fourteenth signal and said twenty-first signal and establishing a twenty-second signal which is responsive to the difference between said fourteenth signal and said twenty-first signal, wherein said twenty-second signal is scaled so as to be representative of the position of a third control valve, which is operably located so as to control the flow rate of said fourth fluid stream, required to maintain the actual flow rate of said fourth fluid stream substantially equal to the desired flow rate represented by said fourteenth signal;
manipulating said third control valve in response to said twenty-second signal;
establishing a twenty-third signal representative of the actual flow rate of said fifth fluid stream;
comparing said sixteenth signal and said twenty-third signal and establishing a twenty-fourth signal which is responsive to the difference between said sixteenth signal and said twenty-third signal, wherein said twenty-fourth signal is scaled so as to be representative of the position of a fourth control valve, which is operably located so as to control the flow of said fifth fluid stream, required to maintain the actual flow rate of said fifth fluid stream substantially equal to the desired flow rate represented by said sixteenth signal; and
manipulating said fourth control valve in response to said twenty-fourth signal.

* * * * *